United States Patent
Harris et al.

(10) Patent No.: US 6,408,629 B1
(45) Date of Patent: Jun. 25, 2002

(54) COMBUSTOR LINER HAVING PREFERENTIALLY ANGLED COOLING HOLES

(75) Inventors: Tariq Kay Harris, Cincinnati; Michael Burke Briski, Hamilton, both of OH (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 09/678,069

(22) Filed: Oct. 3, 2000

(51) Int. Cl.[7] .............................................. F02C 3/04
(52) U.S. Cl. ..................................... 60/804; 60/754
(58) Field of Search ............................. 60/39.36, 265, 60/752, 754, 756, 755, 804; 431/352

(56) References Cited

U.S. PATENT DOCUMENTS

| | | | |
|---|---|---|---|
| 2,692,014 A | 10/1954 | MacCracken | 60/754 |
| 2,930,194 A | * 3/1960 | Perkins | 431/352 |
| 3,623,711 A | 11/1971 | Thorstenson | 60/754 |
| 3,898,797 A | * 8/1975 | Wood | 431/352 |
| 4,872,312 A | 10/1989 | Iizuka et al. | 60/754 |
| 5,181,379 A | 1/1993 | Wakeman et al. | 60/261 |
| 5,279,127 A | 1/1994 | Napoli | 60/754 |
| 6,145,319 A | * 11/2000 | Burns et al. | 60/754 |
| 6,205,789 B1 | * 3/2001 | Patterson et al. | 60/754 |

* cited by examiner

Primary Examiner—Louis J. Casaregola
(74) Attorney, Agent, or Firm—William Scott Andes; Pierce Atwood

(57) ABSTRACT

Cooling film effectiveness is increased in multi-hole film cooled combustor liners having dilution holes by altering the orientation of the film cooling holes in the vicinity of the dilution holes. The cooling holes include a first group of cooling holes angled in a first circumferential direction and a second group of cooling holes angled in a second circumferential direction, opposite to the first circumferential direction. The cooling holes in the second group of cooling holes are located between adjacent ones of the dilution holes so as to direct cooling air to the regions immediately downstream of the dilution holes. Groups of oppositely directed cooling holes can be used with other hot spot regions on the liner, such as those caused by borescope holes, igniter ports and swirling combustor gases.

16 Claims, 2 Drawing Sheets

COMBUSTOR LINER HAVING PREFERENTIALLY ANGLED COOLING HOLES

BACKGROUND OF THE INVENTION

This invention relates generally to gas turbine engines and more particularly to film cooled combustor liners used in such engines.

A gas turbine engine includes a compressor that provides pressurized air to a combustor wherein the air is mixed with fuel and burned for generating hot combustion gases. These gases flow downstream to one or more turbines that extract energy therefrom to power the compressor and provide useful work such as powering an aircraft in flight. Combustors used in aircraft engines typically include inner and outer combustor liners to protect surrounding engine structure from the intense heat generated by the combustion process. The combustor liners are cooled to meet life expectancy requirements.

Liner cooling is commonly provided by diverting a portion of the compressed air (which is relatively cool) and causing it to flow over the outer surfaces of the liners. In addition, a thin layer of cooling air is provided along the combustion side of the liners by directing cooling air flow through an array of very small cooling holes formed in the liners. These cooling holes are axially slanted in a downstream direction and typically all have the same circumferential orientation. This technique, referred to as multi-hole film cooling, reduces the overall thermal load on the liners because the mass flow through the cooling holes dilutes the hot combustion gas next to the liner surfaces, and the flow through the holes provides convective cooling of the liner walls.

In addition to the film cooling holes, combustor liners are typically provided with dilution holes. The dilution holes, which are considerably larger than the cooling holes, introduce dilution air into the combustion zone. The dilution air quenches the flames so as to control the gas temperature to which the turbine hardware downstream of the combustor will be exposed. The quenching also reduces the level of $NO_x$ emissions in the engine exhaust.

However, each dilution hole represents an area on the liner that lacks film cooling holes. Furthermore, the wake produced by the influx of air through the large dilution holes will disrupt the cooling film behind them. This means that the regions of the liners immediately downstream of dilution holes can experience a loss of cooling film effectiveness. Thus, while film cooling of combustor liners is generally quite effective, the presence of dilution holes can result in hot spots being formed immediately downstream thereof. Over time, the hot spots can induce cracking in the liners, thereby reducing their service life.

Other common liner structural features, such as borescope holes and igniter ports, can disrupt the cooling film and cause hot spots in a similar manner. Cooling film effectiveness can also be weakened by causes other than such structural features. For instance, the flow of compressed air into the combustor is ordinarily swirled to enhance air-fuel mixing. These swirling combustor gases can disrupt cooling film in certain regions of the liners and create hot spots.

Accordingly, there is a need for a combustor liner in which cooling film effectiveness is increased in liner regions that are immediately downstream of disruptive structural features such as dilution holes, borescope holes and igniter ports or are otherwise subject to a loss of cooling film effectiveness.

BRIEF SUMMARY OF THE INVENTION

The above-mentioned need is met by the present invention, which provides a combustor liner having a plurality of dilution holes and a plurality of cooling holes formed therein. The cooling holes include a first group of cooling holes angled in a first circumferential direction and a second group of cooling holes angled in a second circumferential direction, opposite to the first circumferential direction. The cooling holes in the second group of cooling holes are located between adjacent ones of the dilution holes. Groups of oppositely directed cooling holes could be used with other hot spot regions on the liner.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
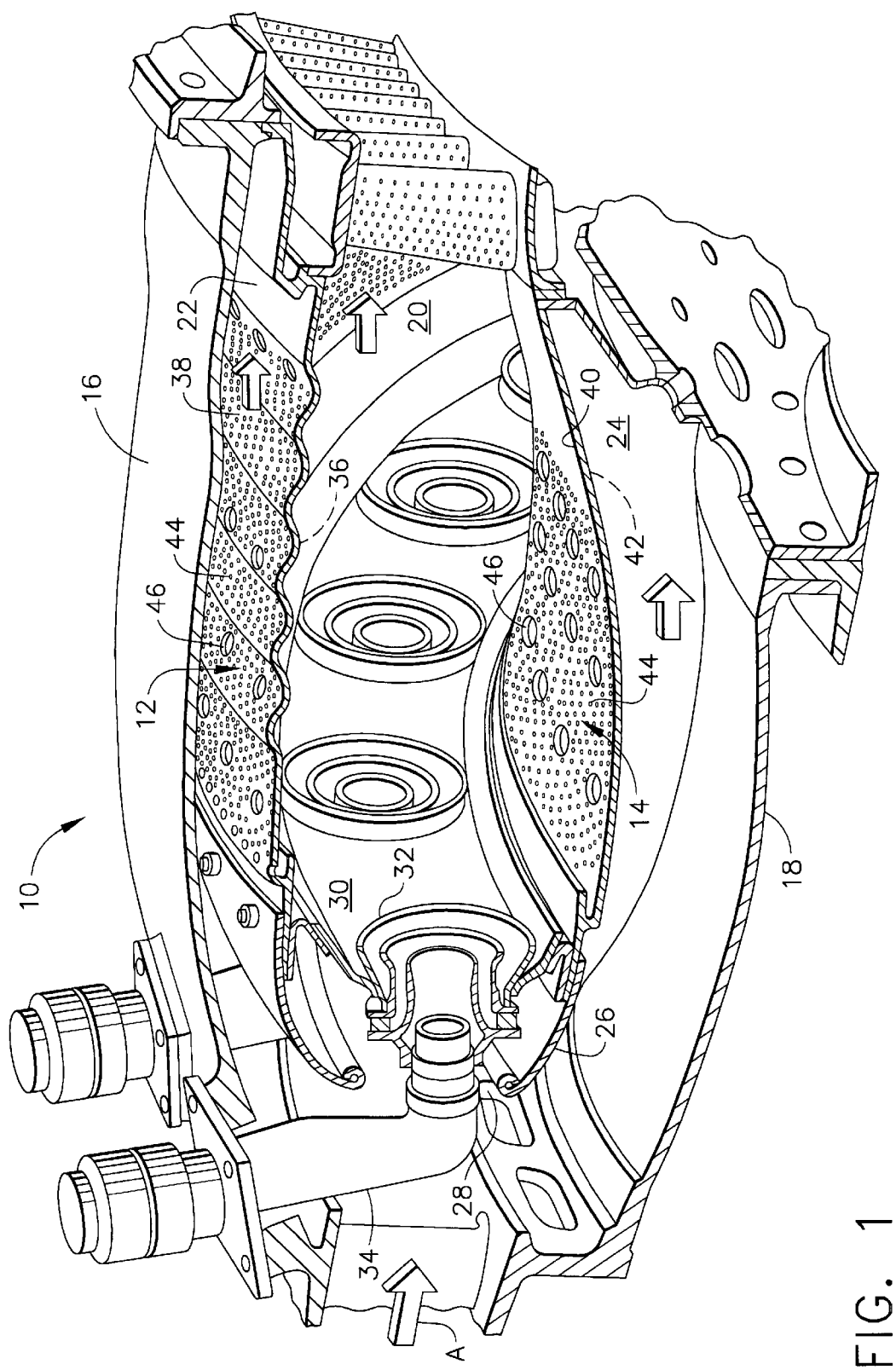
FIG. 1 is a cutaway perspective view of a gas turbine combustor having combustor liners with a unique film cooling hole configuration.

Referring to the drawings wherein identical reference numerals denote the same elements throughout the various views, FIG. 1 shows an exemplary combustor 10 of the type suitable for use in a gas turbine engine. The combustor 10 includes an outer liner 12 and an inner liner 14 disposed between an outer combustor casing 16 and an inner combustor casing 18. The outer and inner liners 12 and 14 are generally annular in form about a centerline axis and are radially spaced from each other to define a combustion chamber 20 therebetween. The outer liner 12 and the outer casing 16 form an outer passage 22 therebetween, and the inner liner 14 and the inner casing 18 form an inner passage 24 therebetween. A cowl assembly 26 is mounted to the upstream ends of outer and inner liners 12 and 14. An annular opening 28 is formed in cowl assembly 26 for the introduction of compressed air into combustor 10. The compressed air is supplied from a compressor (not shown) in a direction generally indicated by arrow A of FIG. 1. The compressed air passes principally through the opening 28 to support combustion and partially into the outer and inner passages 22 and 24 where it is used to cool the liners 12 and 14.

Disposed between and interconnecting the outer and inner liners 12 and 14 near their upstream ends is an annular dome plate 30. A plurality of circumferentially spaced swirler assemblies 32 is mounted in the dome plate 30. Each swirler assembly 32 receives compressed air from the opening 28 and fuel from a corresponding fuel tube 34. The fuel and air are swirled and mixed by swirler assemblies 32, and the resulting fuel/air mixture is discharged into the combustion chamber 20. It is noted that although FIG. 1 illustrates a single annular combustor as an exemplary embodiment, the present invention is equally applicable to any type of combustor, including double annular combustors, which uses multi-hole film cooling.

The outer and inner liners 12 and 14 each comprise a single wall, metal shell having a generally annular and axially extending configuration. The outer liner 12 has a hot side 36 facing the hot combustion gases in the combustion chamber 20 and a cold side 38 in contact with the relatively cool air in the outer passage 22. Similarly, the inner liner 14 has a hot side 40 facing the hot combustion gases in the combustion chamber 20 and a cold side 42 in contact with the relatively cool air in the inner passage 24. Both the liners 12 and 14 include a large number of relatively small film cooling holes 44 formed therein. In each of the outer and inner liners 12 and 14, the film cooling holes 44 are axially slanted from the cold side 38, 42 to the respective hot side 36, 40 in a downstream direction. Thus, cooling air from the outer and inner passages 22 and 24 passing through the cooling holes 44 is directed downstream so as to form a thin cooling film on the hot side of each liner 12 and 14.

Each liner 12 and 14 also includes a plurality of dilution holes 46 formed therein for introducing air into combustor chamber 20. The dilution holes 46 are generally far smaller in number than the film cooling holes 44, and each dilution hole 46 has a cross-sectional area that is substantially greater than the cross-sectional area of one of the cooling holes 44. The dilution holes 46 are arranged in a circumferentially extending row of primary dilution holes and a circumferentially extending row of secondary dilution holes located downstream of the primary dilution holes.

Figure 2:
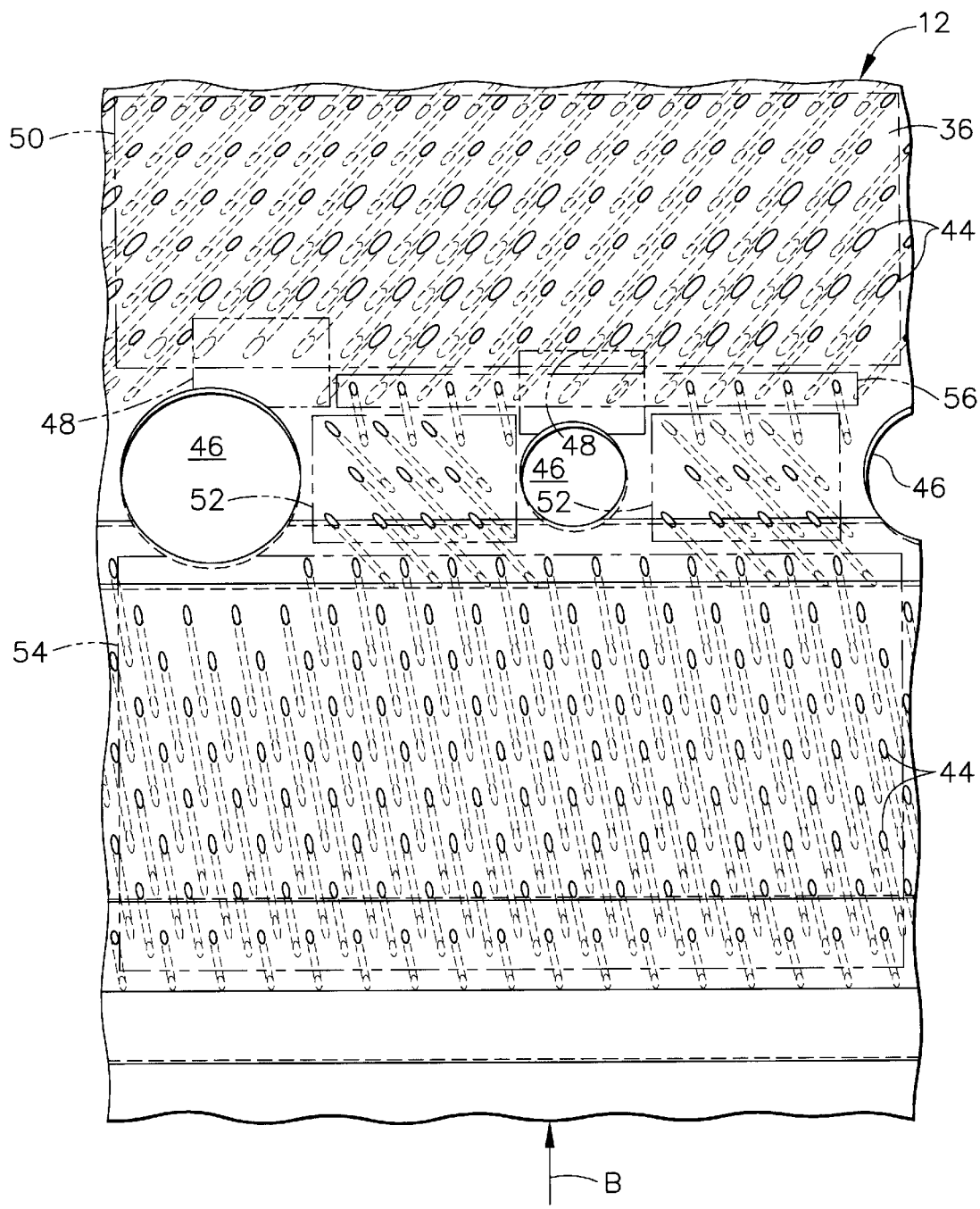
FIG. 2 is a top view of a portion of a combustor liner depicting the unique film cooling hole configuration.

Turning now to FIG. 2, a portion of the hot side 36 of the outer liner 12 is illustrated to show a unique orientation of the cooling holes 44 wherein arrow B indicates the direction of flow through the combustor 10. Although FIG. 2 depicts cooling holes in the outer liner 12, it should be understood that the configuration of cooling holes in the inner liner 14 is substantially identical to that of the outer liner 12. As such, the following description will also apply to the inner liner 14.

Conventionally, film cooling holes are all oriented in the same manner. That is, all cooling holes are axially slanted at the same angle in the downstream direction and at the same angle circumferentially. In the present invention, however, different groupings of the film cooling holes 44 are provided with different circumferential orientations so as to provide an overall cooling hole configuration that effectively cools the entire liner 12. This includes hot spot regions immediately downstream of the dilution holes 46, which regions are denoted by reference numeral 48 in FIG. 2. As used herein, a "hot spot region" is any region of a combustor liner that experiences a loss of cooling film effectiveness with conventional, uniformly oriented cooling holes. This includes, but is not necessarily limited to, regions immediately downstream of dilution holes, borescope holes, igniter ports and the like, as well as regions in which the cooling film is disrupted by swirling combustor gases.

Specifically, the cooling holes 44 are divided into first, second and third groups 50, 52 and 54. The cooling holes of the first group 50 generally occupy a region of the liner 12 that extends axially aft from a point immediately downstream of the dilution holes 46 and extends circumferentially about the liner's entire circumference. The cooling holes of the second group 52 generally occupy the areas of the liner 12 that are located circumferentially between adjacent ones of the dilution holes 46. The cooling holes of the third group 54 generally occupy a region of the liner 12 that extends axially from the forward edge of the liner 12 to a point immediately upstream of the dilution holes 46 and extends circumferentially about the liner's entire circumference.

As seen in FIG. 2, the cooling holes 44 of the first group 50 are all oriented in a first circumferential direction so as to define an angle of about 45 degrees with respect to the combustor's centerline axis, the axis being parallel to the flow direction indicated by arrow B. This is the standard orientation as the first group 50 comprises the largest number of the film cooling holes 44. In contrast, the cooling holes 44 of the second group 52 are all oriented circumferentially so as to define an angle of about −45 degrees with respect to the combustor's centerline axis. Thus, the second group cooling holes are oriented in the opposite circumferential direction as the first group cooling holes. Because of this orientation, the cooling holes 44 of the second group direct film cooling air to the hot spot regions 48, thereby cooling these regions 48 as effectively as the rest of the liner surface. The hot spot regions 48 would not receive adequate film cooling flow if all of the film cooling holes 44 had the same standard orientation of the first group 50 because of the presence of the dilution holes 46.

The cooling holes 44 of the third group 54 are also all oriented in the opposite circumferential direction as the first group cooling holes, but to a lesser degree as the second group cooling holes. Generally, the third group cooling holes define an angle of about −10 degrees with respect to the combustor's centerline axis. Alternatively, the third group cooling holes could define an angle of 0 degrees with respect to the combustor's centerline axis (i.e., parallel to the centerline axis). Orienting the third group cooling holes at an angle of 0 to −10 degrees provides a start and adds strength to the cooling air flow discharged from the cooling holes of the second group 52. This provides the second group cooling flow with sufficient velocity and momentum to reach the hot spot regions 48.

It should be noted that while the cooling holes 44 of the second group 52 are shown at a −45 degree angle and the cooling holes 44 of the third group 54 are shown at a −10 degree angle, the present invention is not limited to these angles. Furthermore, all of the cooling holes 44 of the third group 54 are not required to define the same angle with respect to the combustor's centerline axis. That is, the magnitude of hole angle, while generally being a negative with respect to the centerline axis, could gradually change over the third group region. For instance, the cooling holes 44 at the downstream end of the third group 54 could define a −10 degree angle, and the cooling holes 44 at the upstream end of the third group 54 could define a −45 degree angle. The intermediate cooling holes 44 would gradually change between −10 and −45 degrees. This would provide a smoother transition for the air flow. Non-uniform hole angles could also be applied to the cooling holes of the second group 52.

The film cooling holes 44 can also include an optional fourth group 56. The cooling holes of the fourth group 56 are relatively small in number and are located axially between the second group cooling holes and the first group cooling holes. Like the third group cooling holes, the fourth group cooling holes are oriented in the opposite circumferential direction as the first group cooling holes, but to a lesser degree as the second group cooling holes. Generally, the fourth group cooling holes define an angle of about −10 degrees with respect to the combustor's centerline axis. The cooling air flow discharged from the cooling holes of the fourth group 56 provides a transition to the oppositely angled cooling air flow of the first group cooling holes.

FIG. 2 shows how the cooling holes 44 are oriented to improve cooling around the primary dilution holes 46.

However, it should be understood that the principles of the present invention described above are also applicable to the secondary dilution holes 46 shown in FIG. 1. Furthermore, the unique cooling hole orientation of the present invention could also be applied to other liner features, such as borescope holes and igniter ports, that tend to disrupt film cooling. The unique cooling hole orientation could also be used to cool hot spot regions that result from other causes, such as cooling film disruptions caused by swirling combustor gases.

The foregoing has described a combustor liner in which cooling film effectiveness is increased in liner hot spot regions. While specific embodiments of the present invention have been described, it will be apparent to those skilled in the art that various modifications thereto can be made without departing from the spirit and scope of the invention as defined in the appended claims.

What is claimed is:

1. An annular combustor liner defining an axis and having a plurality of cooling holes formed therein, said cooling holes including a first group of cooling holes angled with respect to said axis in a first circumferential direction and a second group of cooling holes angled with respect to said axis in a second circumferential direction, opposite to said first circumferential direction.

2. The combustor liner of claim 1 further comprising at least one larger hole formed therein and wherein said second group of cooling holes is located and oriented so as to direct cooling air to a region that is downstream of said larger hole.

3. The combustor of claim 2 wherein said cooling holes in said first group of cooling holes define an angle of about 45 degrees with respect to said axis, and said cooling holes in said second group of cooling holes define an angle of about −45 degrees with respect to said axis.

4. The combustor of claim 2 wherein said cooling holes include a third group of cooling holes angled in said second circumferential direction.

5. The combustor of claim 4 wherein said cooling holes in said third group of cooling holes are angled in said second circumferential direction to a lesser degree than said cooling holes in said second group of cooling holes.

6. The combustor of claim 4 wherein said cooling holes in said first group of cooling holes define an angle of about 45 degrees with respect to said axis, said cooling holes in said second group of cooling holes define an angle of about −45 degrees with respect to said axis, and said cooling holes in said third group of cooling holes define an angle of about −10 degrees with respect to said axis.

7. The combustor of claim 4 wherein said cooling holes include a fourth group of cooling holes angled in said second circumferential direction, said third group of cooling holes being located upstream of said larger hole and said fourth group of cooling holes being located downstream of said larger hole.

8. The combustor liner of claim 1 wherein said second group of cooling holes is located and oriented so as to direct cooling air to a hot spot region of said liner.

9. A gas turbine combustor liner comprising:

an annular shell defining an axis;

plurality of dilution holes formed in said shell, said dilution holes being circumferentially spaced about said shell; and a plurality of cooling holes formed in said shell, said cooling holes including a first group of cooling holes angled in a first circumferential direction and a second group of cooling holes angled in a second circumferential direction, opposite to said first circumferential direction, wherein said cooling holes in said second group of cooling holes are located between adjacent ones of said dilution holes.

10. The combustor liner of claim 9 wherein said cooling holes in said second group of cooling holes direct cooling air to regions that are downstream of said dilution holes.

11. The combustor of claim 9 wherein said cooling holes in said first group of cooling holes define an angle of about 45 degrees with respect to said axis, and said cooling holes in said second group of cooling holes define an angle of about −45 degrees with respect to said axis.

12. The combustor of claim 9 wherein said cooling holes include a third group of cooling holes angled in said second circumferential direction.

13. The combustor of claim 12 wherein said cooling holes in said third group of cooling holes are angled in said second circumferential direction to a lesser degree than said cooling holes in said second group of cooling holes.

14. The combustor of claim 12 wherein said cooling holes in said first group of cooling holes define an angle of about 45 degrees with respect to said axis, said cooling holes in said second group of cooling holes define an angle of about −45 degrees with respect to said axis, and said cooling holes in said third group of cooling holes define an angle of about −10 degrees with respect to said axis.

15. The combustor of claim 12 wherein said first group of cooling holes is located downstream of said dilution holes and said third group of cooling holes is located upstream of said dilution holes.

16. The combustor of claim 15 wherein said cooling holes include a fourth group of cooling holes angled in said second circumferential direction, said fourth group of cooling holes being located axially between said first group of cooling holes and said second group of cooling holes.

* * * * *